United States Patent [19]

Wallace et al.

[11] Patent Number: 4,616,955
[45] Date of Patent: Oct. 14, 1986

[54] METHOD AND APPARATUS FOR ENCASING PIPELINE OR CABLE

[75] Inventors: Norman R. Wallace, Walnut Creek; Edgerton G. Jones, San Francisco, both of Calif.

[73] Assignee: Bechtel International Corporation, San Francisco, Calif.

[21] Appl. No.: 661,855

[22] Filed: Oct. 18, 1984

[51] Int. Cl.$^4$ .................................................. F16L 1/00
[52] U.S. Cl. ...................................... 405/158; 405/154; 405/159
[58] Field of Search ........ 405/154, 158, 159, 168–171; 254/134.4, 134.5, 134.3 PA, 134.3 FT

[56] References Cited

U.S. PATENT DOCUMENTS

| | | | |
|---|---|---|---|
| 2,650,314 | 8/1953 | Hennigh et al. | 254/134.5 |
| 3,143,861 | 8/1964 | Dumas | 405/159 |
| 4,048,807 | 9/1977 | Ellers et al. | 405/159 |
| 4,101,114 | 7/1978 | Martin et al. | 254/134.3 FT |
| 4,232,981 | 11/1980 | Lee | 405/154 |
| 4,411,409 | 10/1983 | Smith | 254/134.3 FT |

FOREIGN PATENT DOCUMENTS 26565 4/1883 Fed. Rep. of Germany ... 254/134.4

OTHER PUBLICATIONS

Oil and Gas Journal, Jan. 26, 1959, vol. 57, No. 4, p. 105.

*Primary Examiner*—Dennis L. Taylor
*Attorney, Agent, or Firm*—Townsend and Townsend

[57] ABSTRACT

An encasing method and apparatus in which an external casing, has an insulating, tubular liner therewithin, and one or more pipes or electrical cable are located within the liner. The liner and pipe or cable are floated into the casing after the casing has been flooded with water or other flotation liquid, following the laying of the casing on a support surface, such as the ground or a seabed. After installation of the liner and pipe or cable, water continuously flows through the casing and through the liner, whereby dissipation of waste heat can be controlled by controlling the velocity of flow of the water through the casing. The pipe or cable can be floated out of the liner for repair or replacement without removing or modifying the casing or the liner. Moreover, leaks in the pipe or cable can be monitored on a continuous basis, such as by using a gas chromatograph.

17 Claims, 4 Drawing Figures

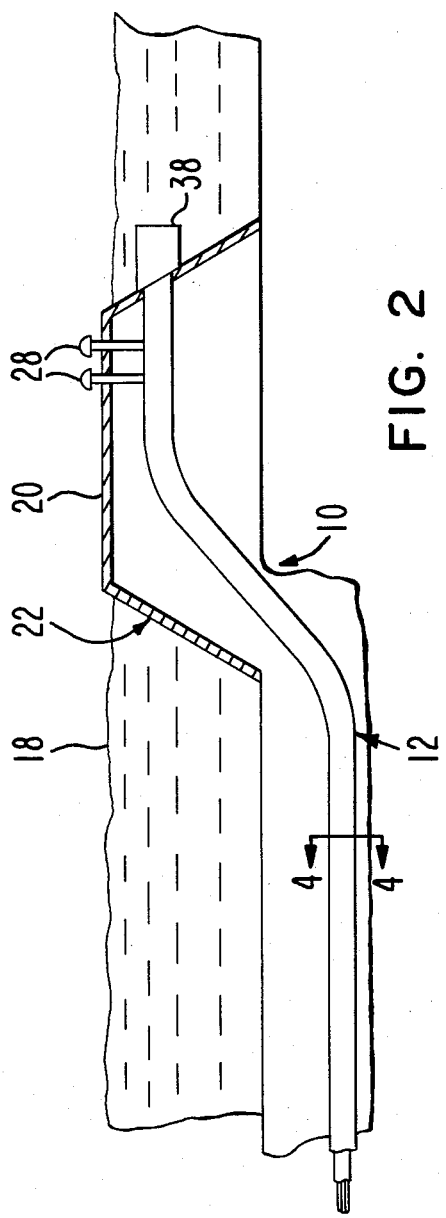
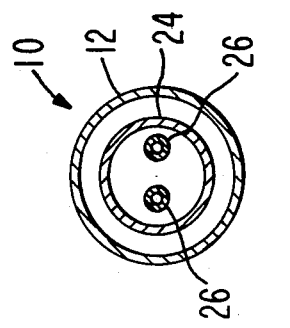
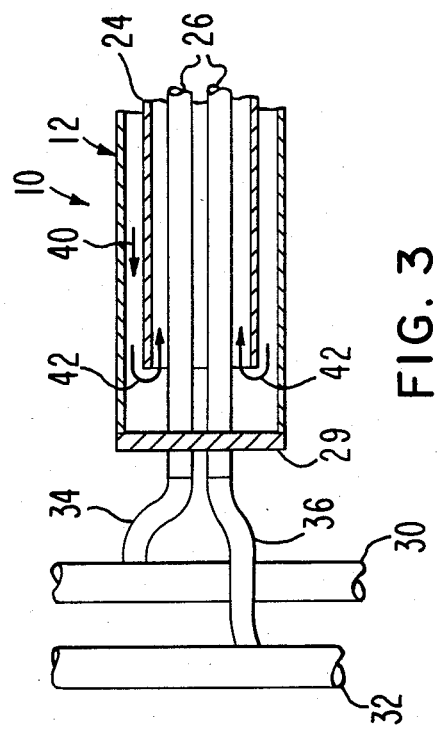

4,616,955

METHOD AND APPARATUS FOR ENCASING PIPELINE OR CABLE

BACKGROUND OF THE INVENTION

1. Field of the Invention

This invention relates to improvements in the encasing of pipes or electrical cables and, more particularly, to a method and apparatus for allowing pipes and cables to be floated into and out of a casing for installation and replacement purposes once the casing has been emplaced.

2. Description of the Prior Art

In a laying of pipelines or the placement of electrical cables in a casing, gut lines have been used in the past to pull pipes and cables through casings only when the casings have been empty. As a result, friction forces limit the length of the lines that can be pulled through such a "dry" casing.

Other attempts have been made to pull lines, such as a pipe or electrical cable through a casing. For instance, U.S. Pat. No. 4,232,981 describes a technique in which beads are mixed with a liquid, such as water, in a casing to reduce dry friction when a pipe or electrical cable is to be pulled over a limited distance through the casing itself. A technique of pulling and sealing a polyethylene liner in a steel pipe is described in an article entitled "New Way To Protect High Pressure Lines" published in Pipeline Industry, March 1981. This publication indicates that friction limits the length of pull to about 2500 feet.

Because of the drawbacks of the techniques mentioned above, a need has existed for an improved casing method and apparatus which allows one or more pipes or cables to be placed in a relatively long casing in a minimum of time to minimize construction costs yet the pipe or cable, once encased, can be readily removed for repair or replacement.

SUMMARY OF THE INVENTION

The present invention satisfies the aforesaid need by providing a method and apparatus in which one or more pipes or electrical cables can be mounted in a casing on the ground, below ground or below water level, such as on a seabed or the like. To this end, the casing can be of conventional materials, such as steel or the like and which can be laid on a support surface in a conventional manner. The casing is flooded with water or other flotation liquid, and one or more pipes or electrical cables, or both pipes and cables, can be floated into the casing and put into place. This result is achieved by making each pipe or cable neutrally buoyant with respect to the flotation liquid in the casing. If insulation is required or would benefit the system, a liner of polyethylene or other suitable insulating, neutrally buoyant material is floated into the casing before or during the time in which the pipe or cable is floated into place.

Once the pipe or cable is put into place, the flotation liquid can be caused to flow through the casing to add or remove heat from the electrical or fluid conductors. In this way, heat can be removed by the water before the heat passes into the environment externally of the casing itself or temperature can be maintained in the fluid conductors to improve the hydraulic efficiency. Moreover, leaks in the pipe can be detected by monitoring the flotation liquid flowing through the casing. This can be achieved by use of a gas chromatograph or other monitoring system at one end of the casing. The location of the leak can be estimated by reversing the direction of flow of the flotation liquid and measuring the time required to detect the leaking material at the other end of the casing.

When it is desired to repair or replace a pipe or cable in the casing, the pipe or cable carrier can be emptied and floated out of the casing so that repair or replacement can occur. This can be done without moving the casing or modifying the structure of the casing itself.

The primary object of the present invention is to provide an improved method and apparatus for encasing one or more pipes or electrical cables wherein the pipes or cables are floated into place within a casing after the casing has been laid on a support surface and flooded with a flotation liquid, whereby the pipes or cables can be quickly installed in the casing and can be floated out of the casing for repair or replacement yet the flotation liquid can provide for control of heat transfer from or to the pipes or cables and the detection of leaks or other malfunctions of the pipe or cable by monitoring the change of a physical characteristic of the flotation liquid as it flows through the casing.

Other objects of this invention will become apparent as the following specification progresses, reference being had to the accompanying drawings for an illustration of the invention.

IN THE DRAWINGS

FIG. 2 is a schematic side view of the apparatus;

FIG. 3 is an enlarged, fragmentary top plan view of the apparatus near one end of the casing; and FIG. 4 is a cross-sectional view taken along line 4—4 of FIG. 2.

DETAILED DESCRIPTION OF THE EMBODIMENT

Figure 1:
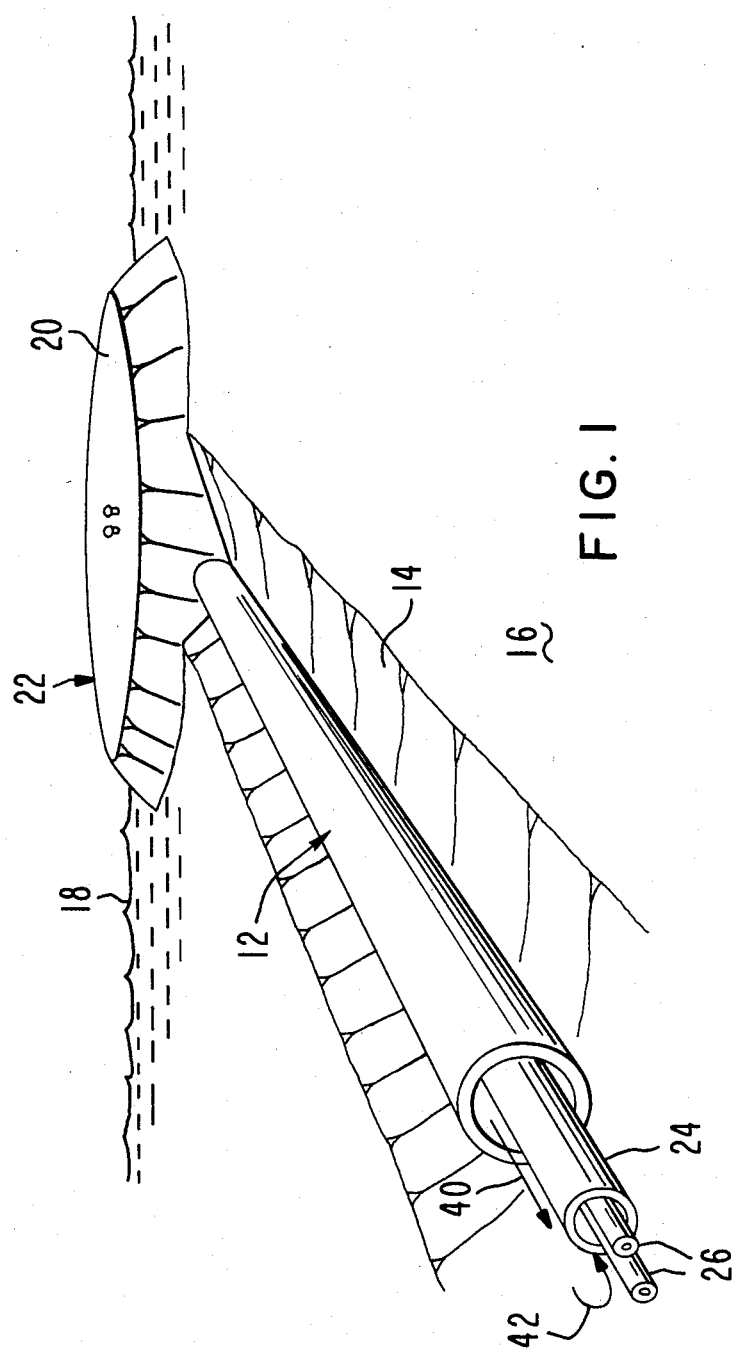
FIG. 1 is a perspective view of the encasing apparatus of the present invention, showing the way in which one or more pipes or electrical cables can be encased within an insulating liner within an external casing, the apparatus being in a body of water, such as in an arctic environment.

The encasing apparatus of the present invention is broadly denoted by the numeral 10 and includes an external casing 12 of a suitable type of steel. The casing, for purposes of illustration, is shown in FIGS. 1 and 2 as being within a trench 14 formed in a seabed 16 in a relatively shallow portion of a body of seawater whose upper level 18 is below the top 20 of a production island 22. The casing, for example, extends between production island 22 and a drilling platform (not shown) which is at a remote location, such as at a distance of several thousand feet or of fifteen or more miles from the production island. The purpose of the trench is to lower the casing below the level of the seabed to give some protection against environmental loads. Specifically, when the casing is below seabed level, the trench helps to protect the casing against wave and current action in the water. Also, in arctic environments, the trench gives some protection against ice pounding and ice scour.

As shown in FIG. 2, one end of casing 12 extends upwardly and into production island 22 in a curving fashion. For purposes of illustration, the casing is in shallow water at a depth of six to ten feet near the production island. For example, the outer diameter of the casing can be about 5 feet. The end of the casing will be within the production island and located so that pipelines or cables within the casing as hereinafter described can be brought to the surface of island 20 or tapped in any suitable manner.

Apparatus 10 further includes a tubular liner 24 shown in FIGS. 1 and 4. Liner 24 has an outer diameter less than the inner diameter of casing 12, and the liner will be buoyant in water or other flotation liquid within casing 12, the flotation liquid filling casing 12 after the casing has been laid in trench 14 or an a support surface. For purposes of illustration, line 24 is of polyethylene.

Liner 24 is adapted to receive and contain one or more pipes or electrical cables, or both pipes and cables, which are adapted to extend over the entire length of the casing, such as from a drilling island to production island 22. For purposes of illustration, FIGS. 1, 3 and 4 show a pair of pipes for transporting liquid or gaseous hydrocarbons through casing 12 to production island 22. The pipes 26 extend into the production island along the length of the curved portion of casing 12 as shown in FIG. 2. A fluid takeoff pipe 28 can be provided for each pipe 26, respectively, at top 20 of production island 22. Thus, the liquid or gaseous hydrocarbons transported through pipes 26 can then be transported to a tank or other collection means. Alternatively, the pipes can be bent elastically to reach the island surface.

FIG. 3 shows the way in which pipes 26 can be connected to a pair of fluid manifolds 30 and 32, such as the source of the liquid or gaseous hydrocarbons, i.e., at a drilling island. In such a case, flexible tubes 34 and 36 are used to place the manifolds in fluid communication with the respective pipes 26.

To construct apparatus 10, casing 12 is initially laid on a support surface, such as on the ground or below water level in a trench 14. Then, the casing is flooded with water or other flotation liquid. If the casing is laid in seawater, the seawater is used to flood the casing. The casing need not be leak tight.

After the casing has been flooded, liner 24, is floated into the casing from either end. Since liner 24 is neutrally buoyant, it can be pulled through the casing with negligible side wall friction. Over long distances, it may be preferable to pull liner 24 or a pipe 26 through the casing by maintaining a pressure differential across a pulling pig.

The liner is pulled while being continuously flooded. Pipes 26 or electrical cables, or both pipes and cables, are floated one by one or together into liner 24 because the pipes and electrical cables will be chosen so as to be neutrally buoyant in the flotation liquid. In this respect, steel used for the pipes has a minimum wall thickness to assure their neutral buoyancy in the water within liner 24. When electrical cables are pulled, they are married to pipes, empty and of sufficient positive buoyancy to make the entire ensemble neutrally buoyant in the flotation liquid. In this way, the liner 24 as well as pipes 26 or electrical cables can be floated into place once the casing 12 has been laid.

Apparatus 10 is put into place by first laying casing 12, following which the casing is flooded with the flotation liquid. Then, liner 24, if required, is floated into place in the water or liquid in casing 12. Pipes 26 (or electrical cables or both) are floated into the liner to complete the installation.

During operation of apparatus 10, water is circulated through casing 12 externally of liner 24 and water is circulated through liner 24. A suitable pump, such as pump 38 (FIG. 2) is used to pump the flotation liquid in the directions of arrows 40 and 42 (FIG. 1) through casing 12 and liner 24 at a predetermined velocity. The circulating flotation liquid in casing 12 and liner 24 can be used to control waste heat loss to the environment between liner 24 and casing 12. For instance, pipes 26 can carry heated hydrocarbons and, if it is desired that the heat not be transferred to the casing and thereby to the surrounding soil, such as in a permafrost location, the velocity of the water in the casing 12 can be increased or the water can be initially cooled so that there will be substantially no heat loss through the casing to the surrounding soil or other natural environmental material.

The fact that pipes 26 (or cables) can be floated into liner 24 allows the pipes to be floated out of the liner for repair or replacement, such as when a leak occurs in a particular pipe. Such a leak can be sensed in one of several different ways. A suitable leak detection system for this purpose is a gas chromatography technique in which hydrocarbons entering the water flow through liner 24 can be detected even in minute quantities. Leaks can be detected by sampling the water flow, heating the sample above the boiling point of water to provide a gaseous specimen, and then analyzing the gas specimen with a gas chromatograph to detect quantitatively the foreign constituents. Such sensing can be done on a continuous basis so that a leak can be detected quickly and steps can be taken immediately to repair the leak.

Apparatus 10 provides a pipeline which can be quickly and easily installed, provides a permanent installation, allows for removal of internal pipes or cables for repair as needed, allows for the detection of leaks by monitoring the flotation liquid in the casing, and allows for the ability to control waste heat loss to the environment by the circulating water or liquid in the casing itself.

We claim:

1. A method for encasing an elongated pipe member in a tubular support comprising:
   laying the support on a surface;
   filling the support with a liquid;
   selecting the diameter and wall thickness of the pipe member so that said pipe member has a buoyancy substantially neutral with respect to the liquid; and
   floating the pipe member into the support from one end of the support.

2. A method as set forth in claim 1, wherein said pipe member has an electrical cable coupled thereto to form a unit, said unit having a buoyancy neutral with respect to said liquid.

3. A method as set forth in claim 1, wherein is included the step of moving the liquid through the support after the pipe member has been put into place in the support to control the dissipation of heat from within the support to the region externally of the support.

4. A method as set forth in claim 3, and including the step of monitoring the flow of liquid through the support to sense a foreign material in the liquid.

5. A method as set forth in claim 1, wherein the liquid is water.

6. A method as set forth in claim 1, wherein is included the step of floating a tubular liner in the support for surrounding the pipe member, said liner being neutrally buoyant with respect to said liquid.

7. A method as set forth in claim 6, wherein the liner is floated into the support the pipe member is floated into the support.

8. A method as set forth in claim 6, wherein the liner surrounds the pipe member and is floated into the support with the pipe member.

9. A method as set forth in claim 6, wherein the material of the liner is polyethylene.

10. A method as set forth in claim 6, wherein the liquid is caused to flow in one direction through the support externally of the liner and then in the opposite direction through the liner.

11. A method as set forth in claim 1, wherein is included the step of keeping the liquid in he support when the pipe member is in place, and floating the pipe member out of the support, whereby the member can be replaced or repaired.

12. A method as set forth in claim 1, wherein is included the step of pulling a pig through the support to pull the pipe member thereinto with a fluid pressure difference being established across the pig.

13. Apparatus for encasing an elongated pipe member comprising:
 an elongated casing adapted to be placed on a support surface, said casing being filled with a liquid with respect to which the pipe member has a substantially neutral buoyancy;
 a tubular liner within the casing, said liner having a substantially neutral buoyancy with respect to the liquid in the casing, said liner being filled with said liquid and adapted to receive the pipe member, said pipe member being inserted into the liner by being floated through the liquid as the liner is floated in the liquid; and
 means for pumping the liquid through the casing and the liner.

14. Apparatus as set forth in claim 13, when the liquid flows through casing is in a direction opposite to the liquid flow through the liner.

15. Apparatus as set forth in claim 13, wherein is included a means for detecting foreign material in the liquid flowing through the casing.

16. Apparatus as set forth in claim 15, wherein said detecting means comprises a gas chromatograph.

17. Apparatus as set forth in claim 12, wherein the liquid is water and the water moves through the casing with a velocity sufficient to permit control of the dissipation of heat energy through the casing to the region externally thereof.

* * * * *